(12) United States Patent  
Guynn et al.

(10) Patent No.: US 7,298,538 B2  
(45) Date of Patent: Nov. 20, 2007

(54) ROTARY OPTICAL SWITCH (75) Inventors: Roy Guynn, Blacksburg, VA (US); Vincent J. Tekippe, The Villages, FL (US); John Carberry, Talbott, TN (US)

(73) Assignee: Neptec Optical Solutions, Inc., Fremont, CA (US)

( * ) Notice: Subject to any disclaimer, the term of this patent is extended or adjusted under 35 U.S.C. 154(b) by 281 days.

(21) Appl. No.: 11/185,137

(22) Filed: Jul. 20, 2005

(65) Prior Publication Data

US 2006/0072873 A1 Apr. 6, 2006

Related U.S. Application Data

(60) Provisional application No. 60/589,454, filed on Jul. 20, 2004.

(51) Int. Cl.
```
G02B 26/08    (2006.01)
G02B 26/00    (2006.01)
G02B 6/26     (2006.01)
G02B 6/42     (2006.01)
G02B 6/32     (2006.01)
```
(52) U.S. Cl. .................. 359/212; 359/223; 359/226; 359/211; 359/291; 385/16; 385/18; 385/33
(58) Field of Classification Search ........ 359/211–214, 359/223, 226, 204, 291, 290; 385/15–18, 385/33, 34, 26, 21, 22
See application file for complete search history.

(56) References Cited

U.S. PATENT DOCUMENTS

| | | | |
|---|---|---|---|
| 3,697,185 | A | 10/1972 | Kassel et al. |
| 4,403,861 | A | 9/1983 | Boisde et al. |
| 4,477,190 | A | 10/1984 | Liston et al. |
| 4,820,045 | A | 4/1989 | Boisde et al. |
| 5,450,194 | A | 9/1995 | Dureault et al. |
| 5,680,220 | A | 10/1997 | Delignieres et al. |
| 6,191,860 | B1 | 2/2001 | Klinger et al. |
| 6,522,800 | B2 | 2/2003 | Lucero |
| 6,549,691 | B1 | 4/2003 | Street et al. |
| 6,611,334 | B1 | 8/2003 | Fernando et al. |
| 6,661,512 | B2 | 12/2003 | Fernando et al. |
| 6,735,006 | B2 | 5/2004 | Carberry et al. |
| 2002/0061159 | A1 | 5/2002 | Dahmani et al. |
| 2004/0252937 | A1 | 12/2004 | Guynn et al. |
| 2005/0171437 | A1 | 8/2005 | Carberry |

*Primary Examiner*—Alicia Harrington  
*Assistant Examiner*—Brandi Thomas  
(74) *Attorney, Agent, or Firm*—Alan H. MacPherson; MacPherson Kwok Chen & Heid LLP (57) ABSTRACT

An apparatus for directing a light path sequentially between multiple positions. A rotary switch rotates a light beam from a prism relative to a plurality of optical elements arranged radially on a switch body. In one embodiment, a prism rotates in the switch body, causing the light beam to sweep through the optical elements. In another embodiment, the switch body rotates about a prism transmitting the light beam. In various embodiments, the optical elements include a photodetector, a filter and a photodetector pair, a reflector, and a filter and a reflector.

29 Claims, 7 Drawing Sheets

ROTARY OPTICAL SWITCH

CROSS-REFERENCE TO RELATED APPLICATIONS

This application claims the benefit of Provisional Application Ser. No. 60/589,454, filed Jul. 20, 2004.

STATEMENT REGARDING FEDERALLY SPONSORED RESEARCH OR DEVELOPMENT

Not Applicable

BACKGROUND OF THE INVENTION

1. Field of Invention

This invention pertains to an optical switch. More particularly, this invention pertains to an optical switch that directs a light path sequentially between multiple positions radially surrounding a rotating optical member.

2. Description of the Related Art

In prior art optical switching applications the switch moves from one stable position into a second or third or larger number of stable positions, such that there is a reciprocal movement, or change in inertial position, either kinetically or electro-optically. In such a case, there are limits to the rate of interrogation, and also to the number of discrete elements that can be used for interrogations.

BRIEF SUMMARY OF THE INVENTION

According to one embodiment of the present invention, a rotary switch for directing a light path sequentially between multiple positions is provided. The rotary switch rotates a light beam from a prism relative to a plurality of optical elements arranged radially on a switch body. In one embodiment, a prism rotates in the switch body, causing the light beam to sweep through the optical elements. In another embodiment, the switch body rotates about a prism transmitting the light beam. In one embodiment, the optical elements include a filter and photodetector pair. In another embodiment, the optical elements include a filter and a reflector.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for directing a light path sequentially between multiple positions is disclosed. The optical switch is generally identified as item 10 in the drawings. The illustrated embodiments of the rotary optical switch 10 show the use of filters 122 in the light path.

Figure 1:
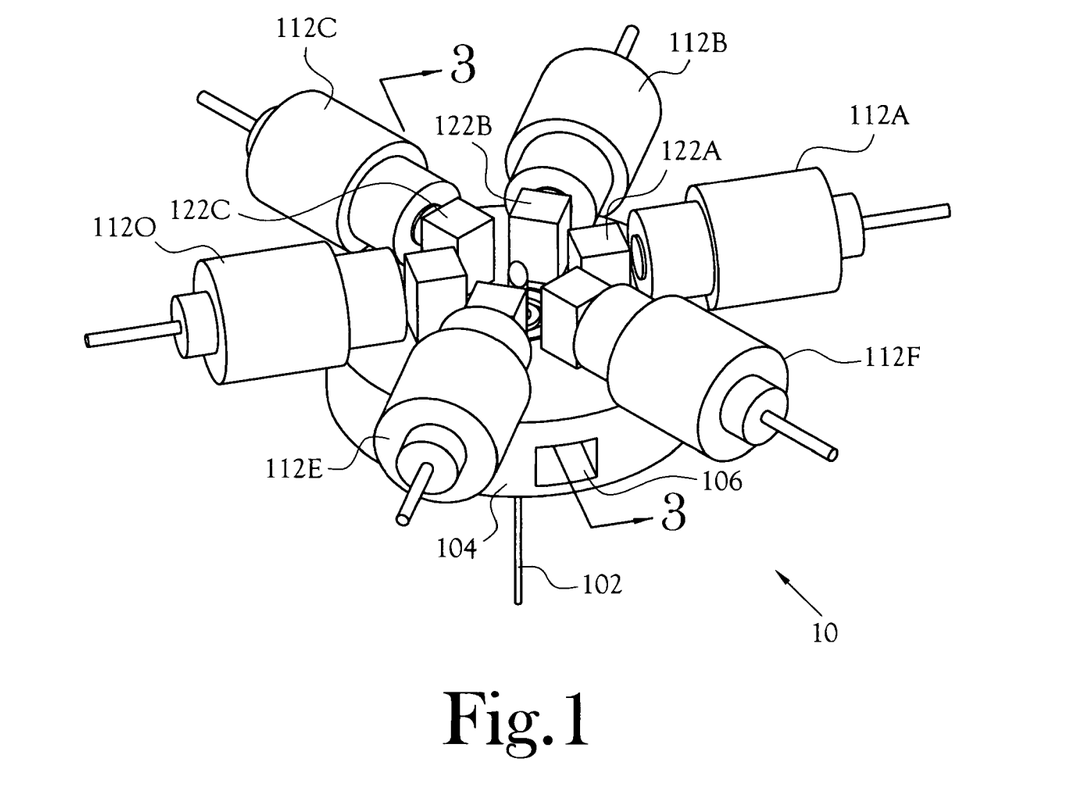
FIG. 1 is a perspective view of one embodiment of a rotary optical switch.

FIG. 1 illustrates a perspective view of one embodiment of a rotary optical switch 10. An optical fiber 102 enters along the axis of a switch body, or support member, 104 that has photo detectors 112 mounted radially along the circumference of the body 104. Adjacent the optical input port of each photo detector 112A, B, C, D, E, and F is a filter 122A, B, C, D, E, and F. An optical signal passes through the optical fiber 102 and into a rotating prism 204 that directs the optical signal sequentially through each filter 122 and to each optical sensor 112. The filters 122 and photodetectors 112 are optical elements that act upon or respond to a light beam.

In one embodiment, the switch body 104 is constructed of a material of low thermal expansion, for instance ceramic or glass or specialty metal such as Kovar, but which is also relatively stiff, having an attractive modulus of elasticity. The switch body 104 has a size such that the beam of light launched into free space travels a modest distance in free space with minimal dispersion, for example, 10-65 millimeters.

Figure 2:
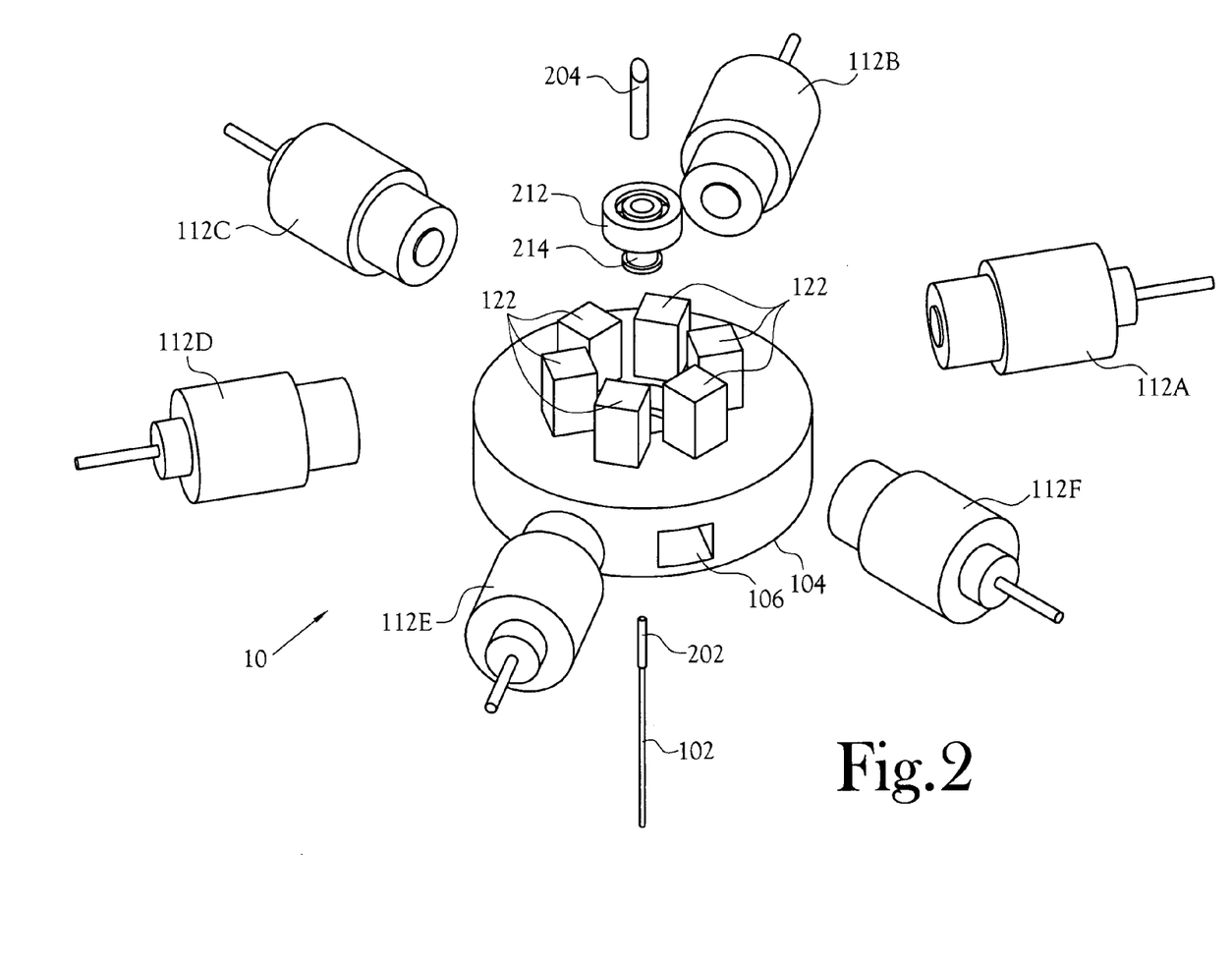
FIG. 2 is an exploded perspective view of the rotary optical switch.

FIG. 2 illustrates an exploded perspective view of the rotary optical switch 10. The optical fiber 102 is terminated in a collimator 202, which is aimed at the bottom of a cylindrical prism 204. The cylindrical prism 204 is in a bearing assembly 212 that is secured in the switch body 104. The cylindrical prism 204 protrudes above the top face of the switch body 204 such that an optical beam received from the collimator 202 is directed transversely to the longitudinal axis of the cylindrical prism 204. A plurality of filters 122A, B, C, D, E, and F surround the cylindrical prism 204 and are in the light path from the cylindrical prism 204 to the photo detectors 112A, B, C, D, E, and F.

The bearing assembly 212, in one embodiment, is a stiff bearing. The bearing assembly 212 is aligned in place and permanently attached in place such that the travel of light from the collimated light from the collimator 202 through the prism 204 can reach all the elements 122, 112 in the element field within tolerances and alignments given the experiences of temperature, vibration, aging and shock.

Figure 3:
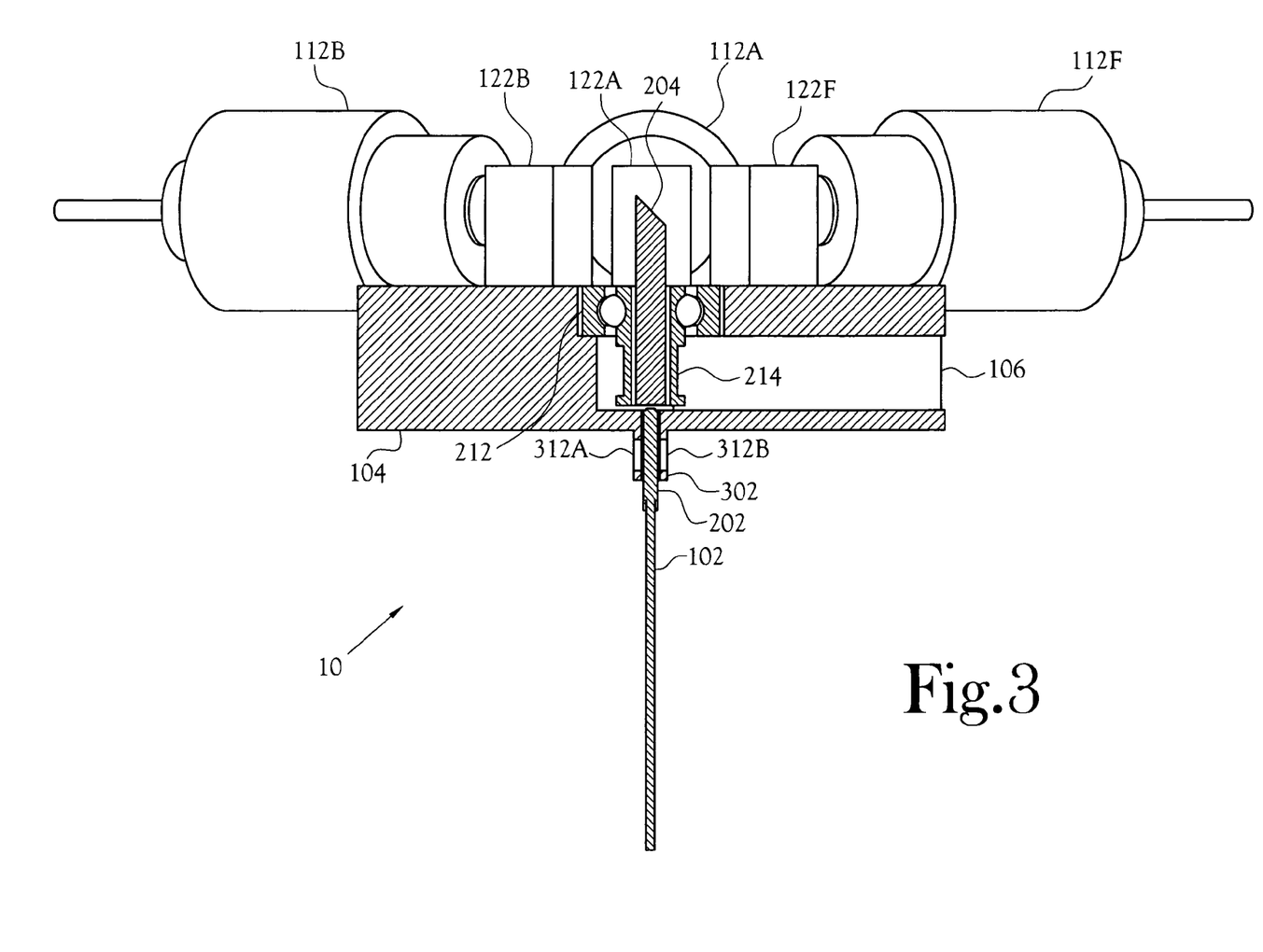
FIG. 3 is a cross-sectional view of the rotary optical switch.

FIG. 3 illustrates a cross-sectional view of the rotary optical switch 10. The collimator 202 is fixed in a sleeve 302 on the bottom surface of the switch body 104. In the illustrated embodiment, the sleeve 302 has opposing slots 312A, 312B for introducing an adhesive to secure the collimator 202 to the sleeve 302.

The cylindrical prism 204 is centered in a bearing assembly 212. The outer race of the bearing assembly 212 is secured to the switch body 104, and the inner race holds the cylindrical prism 204 and has a pulley 214 for engaging a belt (not illustrated) that spins the inner race of the bearing assembly 212. The drive belt passes through the channel 106 to a drive wheel (not illustrated).

The diameter of the bearing pulley 214, in combination with the drive pulley and the speed of the drive motor, determines the rate at which the cylindrical prism 204 rotates. Due to the low moment arm of the cylindrical prism 204 and bearing assembly 212, high rotation speeds are achieved. For example, in one embodiment, the cylindrical prism 204 rotates at 120,000 revolutions per minute (RPM).

At this speed, each optical element 112, 122 would be illuminated by the light beam at a rate of 2,000 times per second. If higher sampling rates are desired, optical elements 112, 122 are duplicated. For example, in the illustrated embodiment there are six optical elements 112, 122. If opposite pairs of optical elements 112, 122 are duplicates, then the effective sampling rate is 4,000 times per second.

Figure 4:
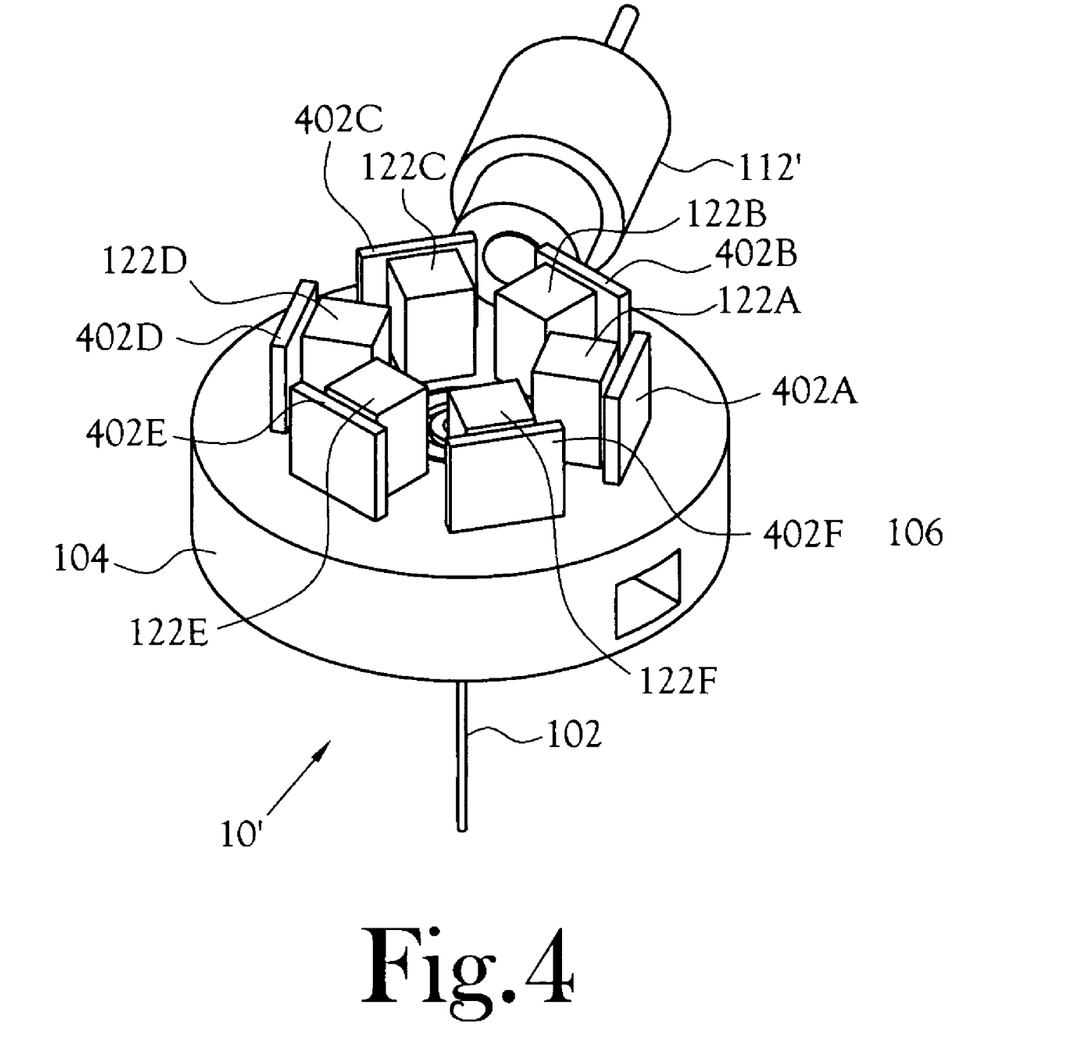
FIG. 4 is a perspective view of a second embodiment of a rotary optical switch.
Figure 5:
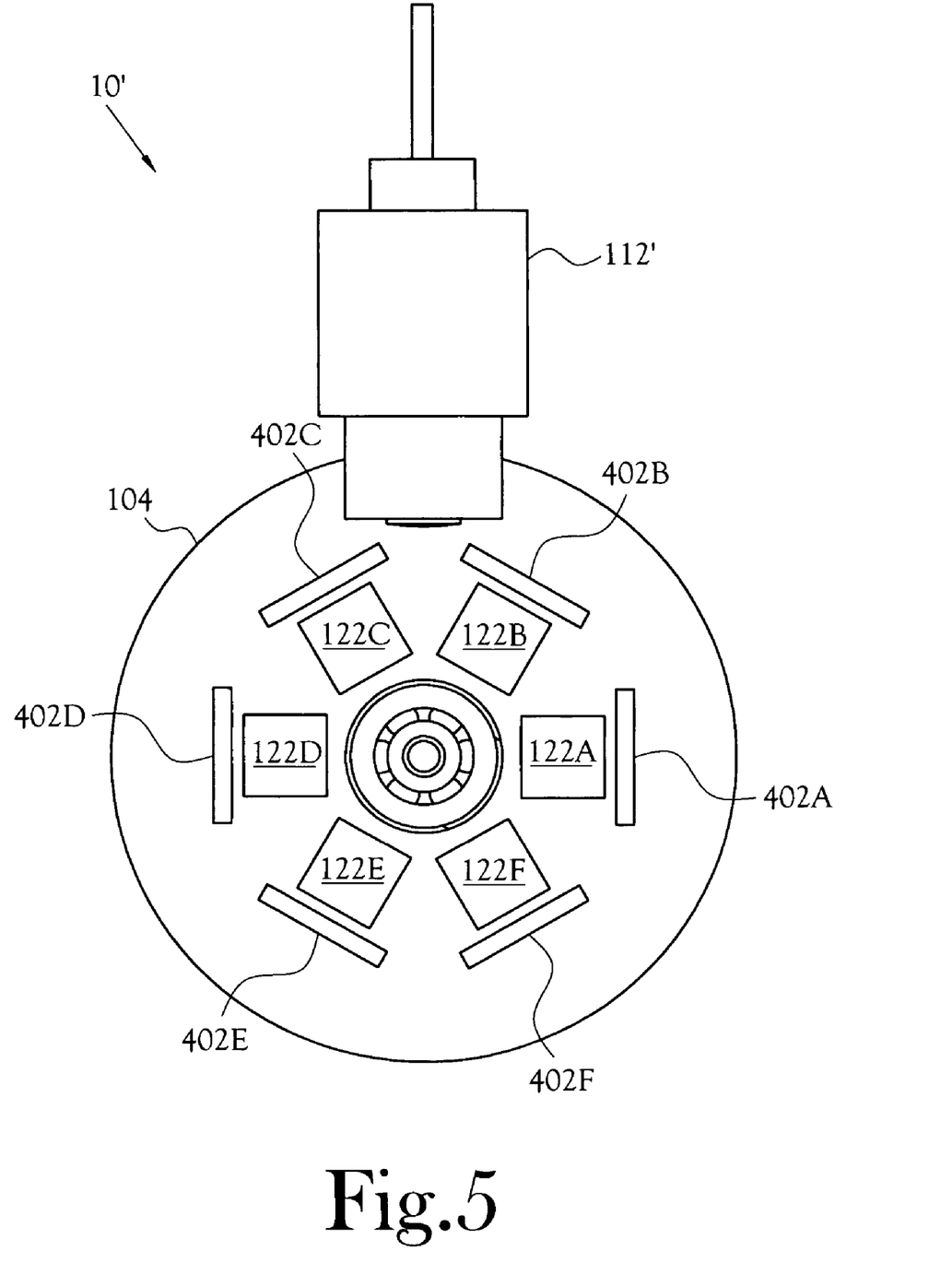
FIG. 5 is a plan view of the second embodiment of the rotary optical switch.

FIG. 4 illustrates a perspective view of a second embodiment of a rotary optical switch 10'. FIG. 5 illustrates a plan view of the second embodiment of the rotary optical switch 10'. In this embodiment, the switch body 104 carries the filters 122A, B, C, D, and E and corresponding mirrors 402A, B, C, D, and E. The mirrors 402 are aligned to reflect the light beam 614 back to the cylindrical prism 204. A single photo detector 112' is aligned with the light beam from the cylindrical prism 204.

In one embodiment, the circular prism 204 rotates and the switch body 104 is held stationary, in a manner similar to that illustrated in FIG. 1 to 3. In this embodiment, the light beam 614 sweeps sequentially through each of the filters 122 and mirrors 402 attached to the switch body 104. In one embodiment, the photo detector 112' provides a timing signal. As the light beam 614 sweeps around the switch body 104 as the cylindrical prism 204 rotates, the light beam 614 is detected by the photodetector 112' as it passes between two filters 122B and 122C, thereby providing a timing signal with indexing information for determining the signals corresponding to each of the filters 122A, B, C, D, E, and F. That is, the photodetector 112' senses the light beam 614 once for each revolution of the prism 204. The resulting pulse stream from the photodetector 112' provides information on the time it takes the prism 204 to make one revolution. Knowing the spacing of the other optical elements 122, 402, it is readily determinable which of the optical elements 122, 402 is affecting the light beam 614. In the illustrated embodiment, the filters 122 and the mirrors 402 are spaced equally circumferentially. The photodetector 112' is aligned to receive the light beam 614 as it passes between two mirrors 402B, 402C with their corresponding filters 122B and 122C.

In one embodiment, the filters 122 and the mirrors 402 are spaced equally circumferentially as if there were one more filter 122 and mirror 402, for example, as if there were seven filters 122 and mirrors 402. In this embodiment, the timing of the photodetector 112' and the light beam 614 reflected by each mirror 402A, B, C, D, E, and F occur at equal time intervals.

In another embodiment, the cylindrical prism 204 and inner race of the bearing assembly 212 are held stationary, and the switch body 104, carrying the filters 122A, B, C, D, and E and mirrors 402A, B, C, D, and E, rotates. As the switch body 104' rotates, each of the filters 122 and mirrors 402 are rotated sequentially through the light beam 614, thereby completing the lighting circuit.

Figure 6:
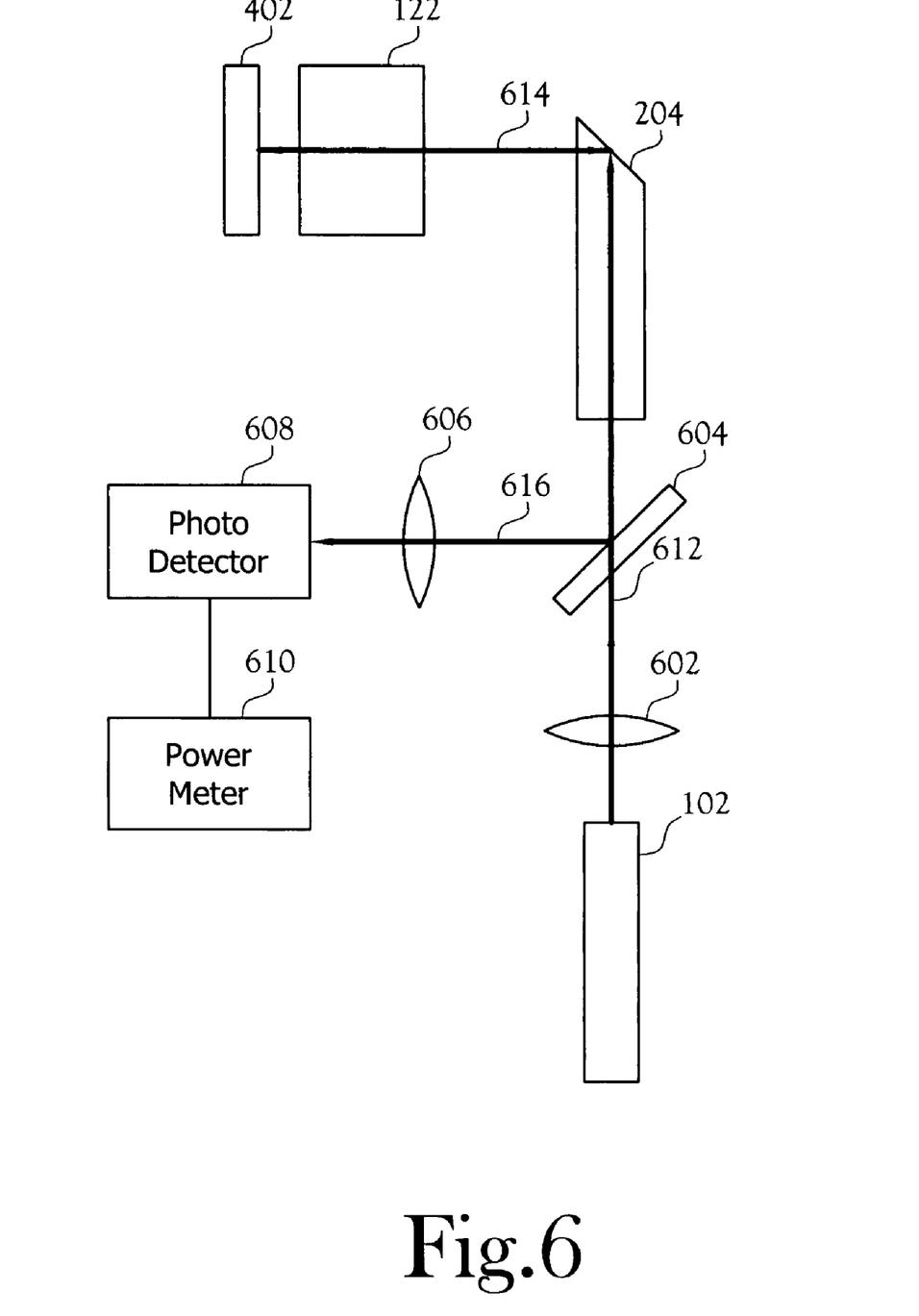
FIG. 6 is a schematic of the light path through one embodiment of the rotary optical switch.

FIG. 6 illustrates one embodiment of a schematic of the light path through the embodiment of the rotary optical switch 10' illustrated in FIGS. 4 and 5. A light beam, or optical signal, 612 is transmitted by the collimator 102, through a focusing lens 602, through a splitter 604, and into the cylindrical prism 204. The light beam 614 is redirected by the cylindrical prism 204 through a filter 122 to the mirror 402. The light beam 614 is then reflected back through the filter 122 and into the cylindrical prism 204, after which it is redirected by the splitter 604. The redirected light beam 616 is focused with a lens 606 and into a photodetector 608, which is monitored by a power meter 610. In another embodiment, the beam splitter 604 is replaced with a circulator to separate the optical signal 614 reflected by the mirror 402 from the originating optical signal 612.

The filter 122 and the mirror 402 illustrated in FIG. 6 are but one of several filters 122 and mirrors 402 attached to the switch body 104. Each of the filters 122 and mirrors 402 are sequentially rotated through the light beam 614, thereby completing the lighting circuit.

In another embodiment, a circulator is used to redirect the reflected light beam 614 into a photodetector 608 coupled to an optical fiber carrying the redirected light beam 616. In another embodiment, the lenses 602, 606 are not used.

Figure 7:
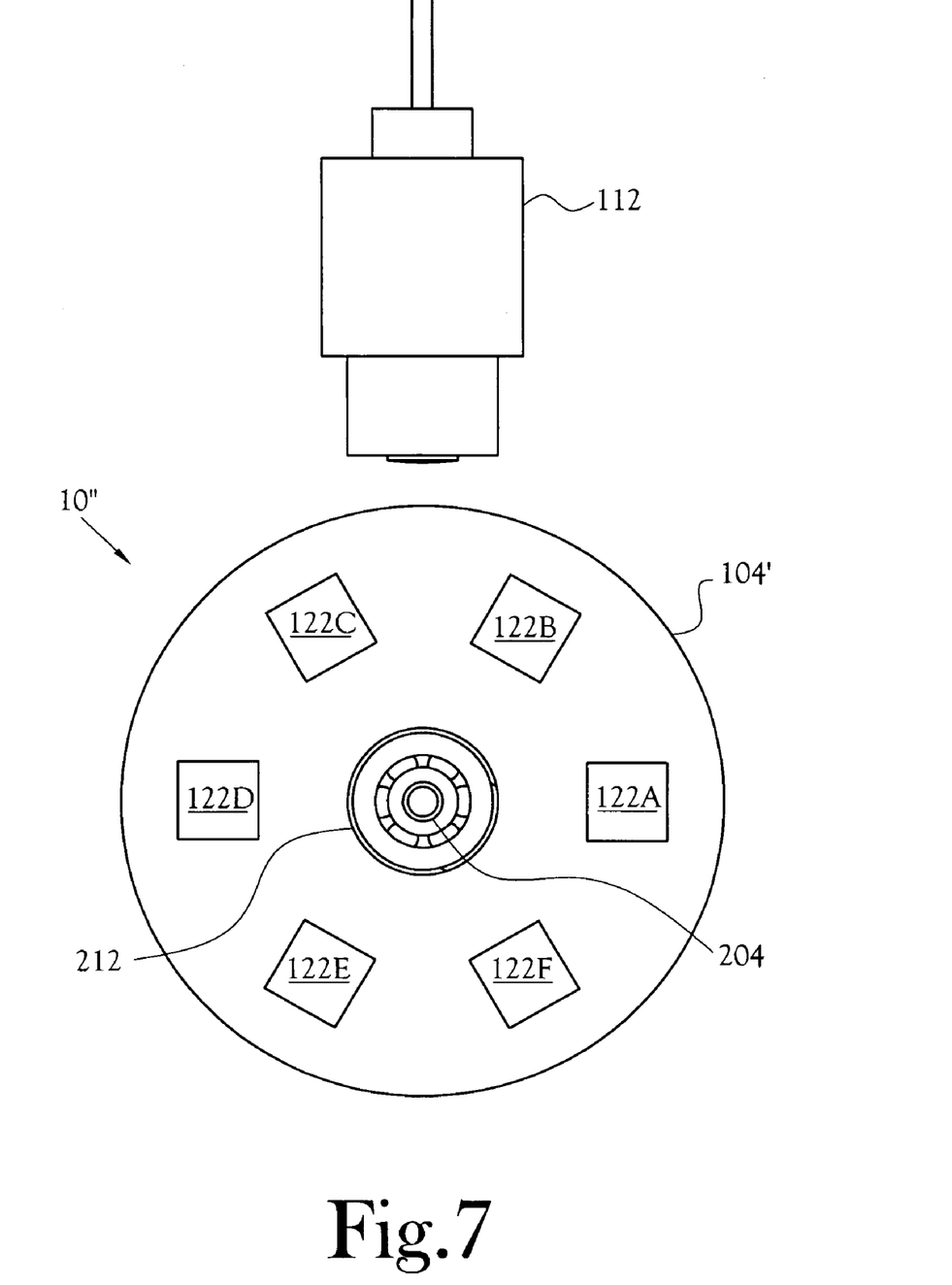
FIG. 7 is a plan view of a third embodiment of a rotary optical switch.

FIG. 7 illustrates a plan view of a third embodiment of a rotary optical switch 10''. In this embodiment, the filters 122 are mounted on the switch body 104' and a single photodetector 112 is mounted in fixed relation to the switch body 104', but not in contact with the body 104'. The switch body 104' rotates about the bearing assembly 112 and the cylindrical prism 204 is held in a fixed position with the light beam directed toward the photodetector 112. As the switch body 104' carrying the filters 122 rotates, each of the filters 122 enters the light beam sequentially.

In the illustrated embodiments, filters 122 and photodetectors 112 are shown as an element in the optical path of the rotating switch 10. In various embodiments, other optical elements besides filters 122 are used such that the light exiting the prism 204 orthogonal to the bearing centerline bears upon and excites, transmits through, reflects, diffracts, and/or in other ways impacts such elements. For example, in one embodiment, Brag gratings are inserted in the optical path. In another embodiment, a collimator is used to collect the light beam and replace the photodetectors 112.

In one embodiment, one or more of the filters 122 are molecular filters that have a spectral signature that is used in the analysis of the transmission, absorption, or reflectance of substances placed in the optical path.

In another embodiment, one of the filters 122 is a neutral density filter used to provide a reference. This reference, in one embodiment, is used to provide an indexing or timing signal to aid in the identification of the other filters 122. In another embodiment, the reference is used to provide a clean sample from which intensity or other characteristics can be ascertained.

The rotary optical switch 10 includes various functions. The function of rotating the prism 204 is implemented, in one embodiment, by the bearing assembly 212 having a pulley 214 adapted to be driven by a motor. In various embodiments, the motor engages the pulley 214 with a drive belt, a geared mechanism, or other power coupling devices.

The function of directing an optical signal 614 between the center axis of the body 104 and each of the plurality of optical elements 112, 122, 402, sequentially, is implemented, in one embodiment, by the prism 204 rotating relative to the switch body 104. In another embodiment, the function is implemented by a mirror rotating relative to the switch body 104.

The function of redirecting the optical signal 612 between a path coaxial with the center axis of the body 104 and a line substantially perpendicular to the center axis is implemented, in one embodiment, by the prism 204. In other embodiments, the function is implemented by a mirror or other optical beam redirector.

The function of rotating the prism 204, mirror, or other reflector is implemented, in one embodiment, by the bearing assembly 212, which includes the pulley 214. The bearing assembly 212 provides alignment between the prism 204 and the body 104, and allows the prism 204 to rotate relative to the body 104.

From the foregoing description, it will be recognized by those skilled in the art that a rotary optical switch 10 has been provided. The rotary optical switch 10 includes a switch body 104 with a plurality of optical elements 112, 122, 402, and a prism 204 or other beam redirector that rotates relative to the body 104. As the prism 204 rotates relative to the body 104 and optical elements 112, 122, 402, an optical signal 612 introduced coaxial to a center axis of the body 104 and prism 204 is directed toward each of the optical elements 112, 122, 402, sequentially.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. A rotary switch for sequentially switching continuously, said rotary switch comprising:
    a support member having a center axis;
    a bearing assembly having an inner member and an outer member, said inner member rotatable about said center axis relative to said outer member, said outer member attached to said support member;
    a first optical element attached to said inner member of said bearing assembly, said first optical element adapted to redirect an optical signal between said center axis and a line substantially perpendicular to said center axis; and
    a plurality of second optical elements attached to said support member, said plurality of second optical elements positioned radially in-line with said line substantially perpendicular to said center axis, said optical signal in-line sequentially with each of said plurality of second optical elements as said first optical element rotates about said center axis.

2. The rotary switch of claim 1 wherein said first optical element is selected from a group of a prism and a mirror.

3. The rotary switch of claim 1 wherein said plurality of second optical elements include at least one selected from a group of a photodetector, a mirror, and a filter.

4. The rotary switch of claim 1 wherein said plurality of second optical elements are evenly spaced radially around said center axis.

5. The rotary switch of claim 1 wherein at least one of said plurality of second optical elements is a mirror positioned to reflect said optical signal into said first optical element.

6. The rotary switch of claim 1 wherein at least one of said plurality of second optical elements is a mirror positioned to reflect said optical signal into said first optical element, and further including a beam splitter positioned along said center axis to divert a portion of said optical signal to a third optical element.

7. The rotary switch of claim 1 wherein at least one of said plurality of second optical elements is a mirror positioned to reflect said optical signal into said first optical element, and further including a circulator positioned along said center axis to divert said reflected optical signal to a third optical element.

8. The rotary switch of claim 1 wherein at least one of said plurality of second optical elements is a photodetector providing an indexing signal for identifying the location of said optical signal with respect to said plurality of second optical elements.

9. The rotary switch of claim 1 further including means for rotating said first optical element.

10. A rotary switch for sequentially switching continuously, said rotary switch comprising:
    a support member having a center axis;
    a plurality of first optical elements attached to said support member, said plurality of first optical elements positioned radially in-line with a line substantially perpendicular to said center axis; and
    a second optical element aligned with said center axis and rotatable about said center axis, said second optical element adapted to redirect an optical signal between said center axis and said line substantially perpendicular to said center axis.

11. The rotary switch of claim 10 wherein said plurality of first optical elements include at least one selected from a group of a photodetector, a mirror, and a filter.

12. The rotary switch of claim 10 wherein said plurality of first optical elements are evenly spaced radially around said center axis.

13. The rotary switch of claim 10 wherein at least one of said plurality of first optical elements is a mirror positioned to reflect said optical signal back into said second optical element after said optical signal exits from said second optical element.

14. The rotary switch of claim 10 wherein at least one of said plurality of first optical elements is a mirror positioned to reflect said optical signal back into said second optical element, and said rotary switch further including a beam splitter positioned along said center axis to divert a portion of said optical signal to a third optical element.

15. The rotary switch of claim 10 wherein at least one of said plurality of first optical elements is a mirror positioned to reflect said optical signal into said second optical element, and further including a circulator positioned along said center axis to divert said reflected optical signal to a third optical element.

16. The rotary switch of claim 10 wherein at least one of said plurality of first optical elements is a photodetector providing an indexing signal for identifying the location of said optical signal with respect to said plurality of first optical elements.

17. The rotary switch of claim 10 wherein said second optical element is selected from a group of a prism and a mirror.

18. The rotary switch of claim 10 further including means for rotating said second optical element.

19. The rotary switch of claim 10 further including a bearing assembly between said support member and said second optical element, said second optical element carried by said bearing assembly when said second optical element rotates.

20. A rotary switch for sequentially switching continuously, said rotary switch comprising:
    a support member rotatable about a center axis;
    a plurality of reflectors attached to said support member and rotating with said support member, said plurality of first optical elements positioned radially in-line with a line substantially perpendicular to said center axis; and
    an optical element aligned with said center axis, said optical element not rotating with said support member, said optical element adapted to redirect an optical signal between said center axis and said line substantially perpendicular to said center axis, said plurality of reflectors positioned to reflect said optical signal toward said optical element when said optical element directs said optical signal toward said one of plurality of reflectors.

21. The rotary switch of claim 20 further including a filter positioned adjacent one of said plurality of reflectors, said filter located in a path of said optical signal.

22. The rotary switch of claim 20 wherein said plurality of reflectors are evenly spaced radially around said center axis.

23. The rotary switch of claim 20 wherein at least one of said plurality of reflectors is a mirror.

24. The rotary switch of claim 20 further including a beam splitter positioned along said center axis to divert a portion of said optical signal reflected by said plurality of reflectors to a third optical element.

25. The rotary switch of claim 20 further including a circulator positioned along said center axis to divert said optical signal reflected by said plurality of reflectors to a third optical element.

26. The rotary switch of claim 20 wherein said optical element is selected from a group of a prism and a mirror.

27. The rotary switch of claim 20 further including a bearing assembly between said support member and said optical element, said second optical element carried by said bearing assembly when said support member rotates.

28. A rotary switch for sequentially switching continuously, said rotary switch comprising:

a support member rotatable about a center axis;

a plurality of optical elements attached to said support member, said plurality of optical elements positioned radially in-line with a line substantially perpendicular to said center axis;

a means for directing an optical signal between said center axis and each of said plurality of optical elements, sequentially.

29. The rotary switch of claim 28 wherein said means for directing said optical signal includes a means for redirecting said optical signal between a path coaxial with said center axis and said line substantially perpendicular to said center axis, and a means for rotating said means for redirecting.

* * * * *